Figure 11:
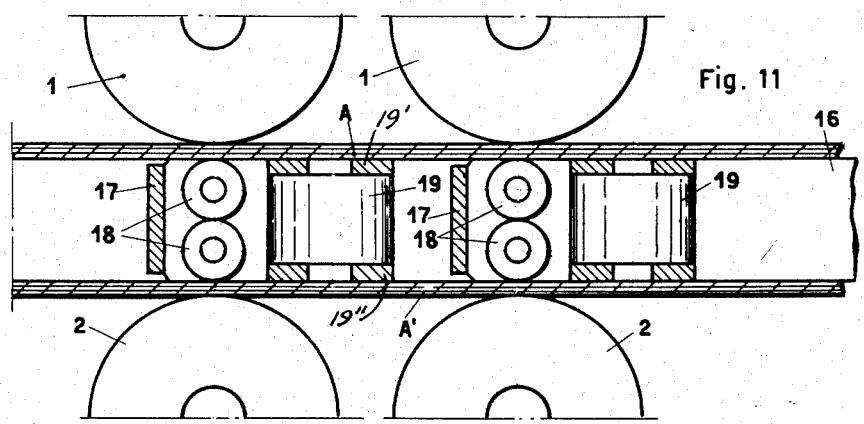

Jan. 12, 1954
G. STEFFENINO
2,665,735
PRODUCTION OF A CONTINUOUS MONOLITHIC HOLLOW
MEMBER FROM HEAT WELDABLE MATERIAL
Filed Aug. 4, 1948
5 Sheets-Sheet 1
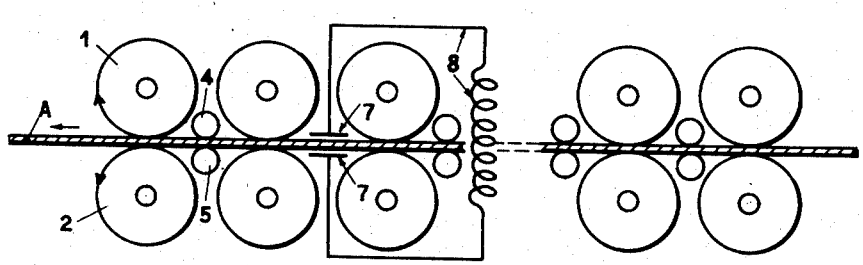
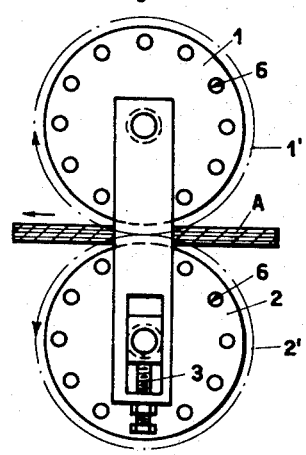
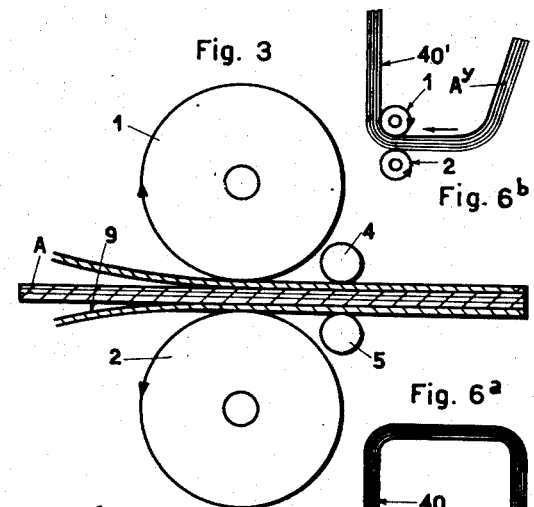
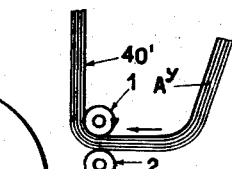
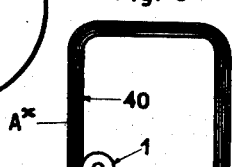
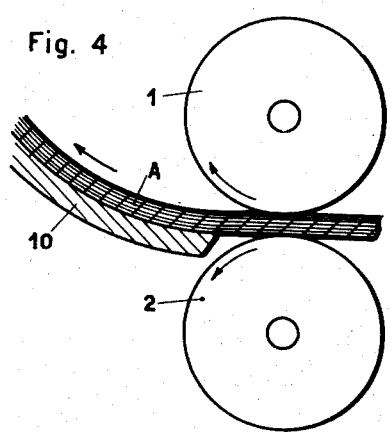
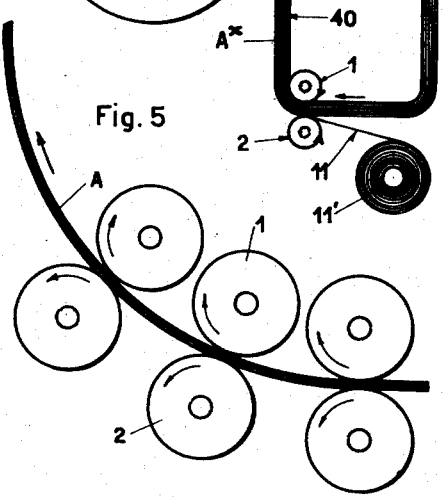
Inventor
G. Steffenino
By Mason & Downing Wickly
Attys Jan. 12, 1954
G. STEFFENINO
2,665,735
PRODUCTION OF A CONTINUOUS MONOLITHIC HOLLOW
MEMBER FROM HEAT WELDABLE MATERIAL
Filed Aug. 4, 1948
5 Sheets-Sheet 2
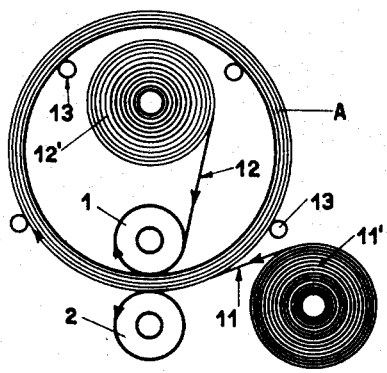
Fig. 6
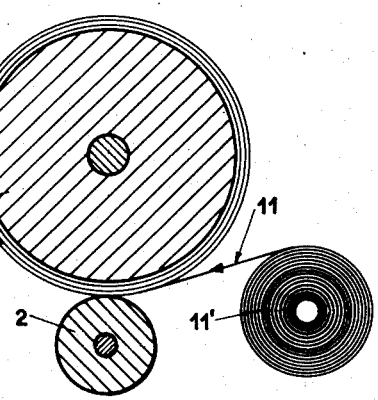
Fig. 7
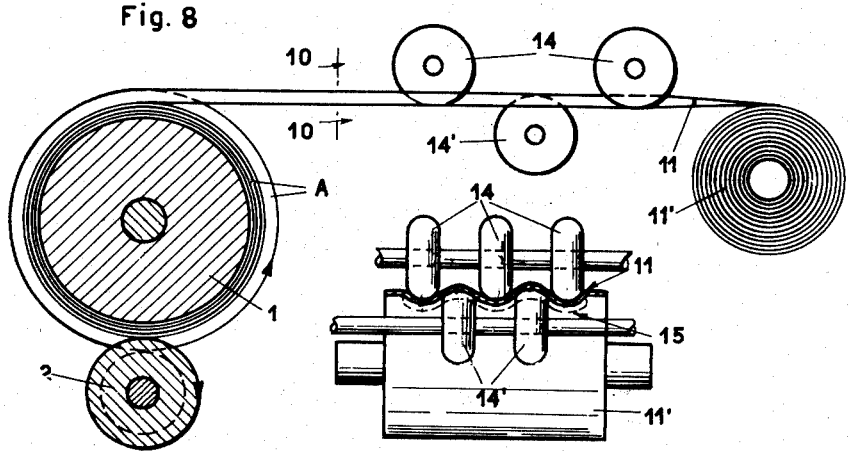
Fig. 8
Fig. 10
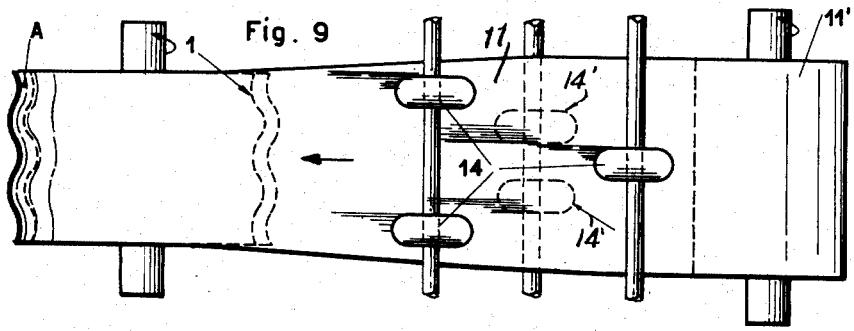
Fig. 9
Inventor
G. Steffenino
By Hancock Dorning Leibold
Attys Jan. 12, 1954  G. STEFFENINO  2,665,735
PRODUCTION OF A CONTINUOUS MONOLITHIC HOLLOW
MEMBER FROM HEAT WELDABLE MATERIAL
Filed Aug. 4, 1948                                    5 Sheets-Sheet 3

Inventor
G. Steffenino

Jan. 12, 1954  G. STEFFENINO  2,665,735
PRODUCTION OF A CONTINUOUS MONOLITHIC HOLLOW
MEMBER FROM HEAT WELDABLE MATERIAL
Filed Aug. 4, 1948  5 Sheets-Sheet 4
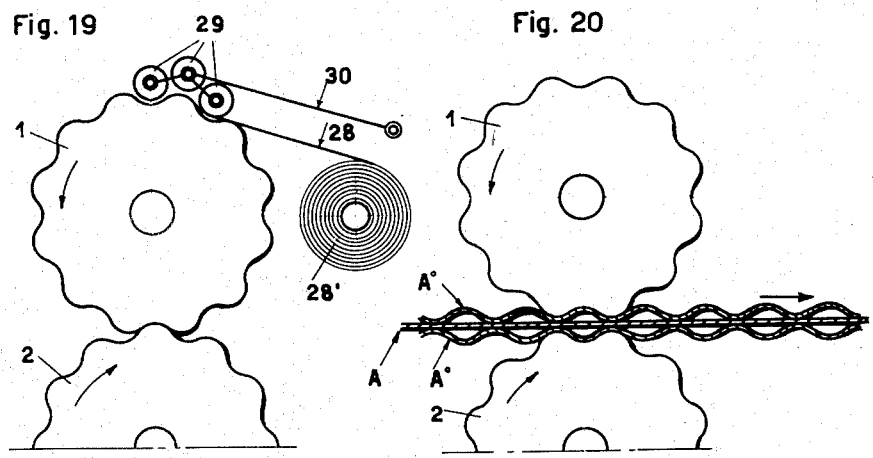
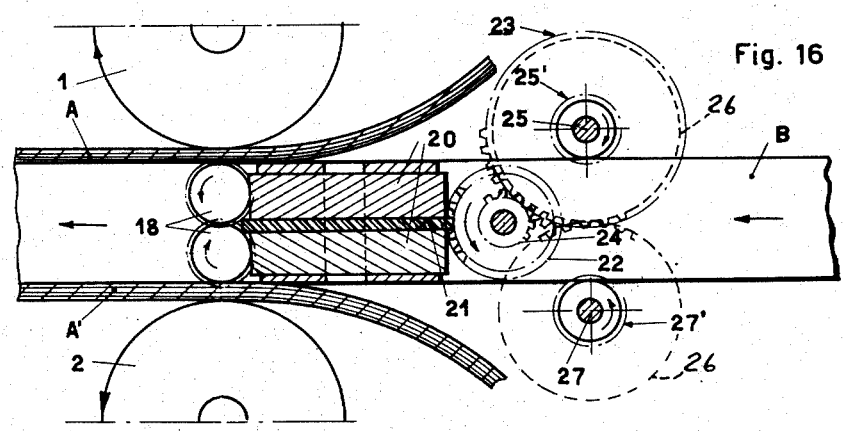
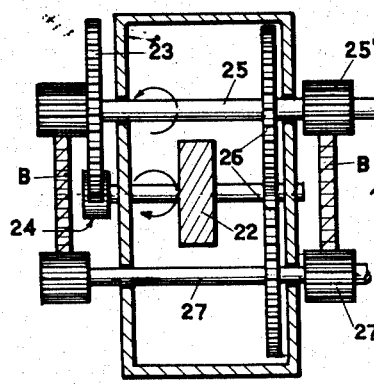
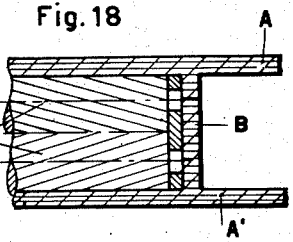
Inventor
G. Steffenino Jan. 12, 1954

G. STEFFENINO 2,665,735

PRODUCTION OF A CONTINUOUS MONOLITHIC HOLLOW
MEMBER FROM HEAT WELDABLE MATERIAL

Filed Aug. 4, 1948

5 Sheets-Sheet 5

Inventor
G. Steffenino
By Elscoh Downing Seebly
Attys.

Patented Jan. 12, 1954

2,665,735

UNITED STATES PATENT OFFICE 2,665,735

PRODUCTION OF A CONTINUOUS MONO-LITHIC HOLLOW MEMBER FROM HEAT WELDABLE MATERIAL

Giuseppe Steffenino, Turin, Italy

Application August 4, 1948, Serial No. 42,424

Claims priority, application Italy August 8, 1947

6 Claims. (Cl. 154—1.6)

The present invention relates broadly to the art of forming panels or elements from fibrous material.

Hitherto, panels and elements composed of fibrous materials with or without a binder of a synthetic resin, glue or a conglomerating varnish have been obtained by pressing the material into molds or between smooth sheets, and applying heat at the required temperature. In order to obtain a panel of a size of the order of 1 by 2 metres it is necessary to have a sheet and a countersheet of the same dimension or sheets having a total surface of 20,000 sq. cms. and assuming that a pressure of 250 kg. per sq. cm. is used, it is necessary to employ a 5,000 ton press. This method of molding sheets is obviously expensive and takes a long time.

The present invention relates to a process for producing elements or panels of fibrous material with or without a binder of synthetic resin, which is very different from the molding process, the elements or panels being obtained in a continuous manner by passing the material through at least one pair of laminating cylinders, in order to subject the material to pressure and at the same time apply heat to the required temperature for the baking and polymerization of the resin binder. Since the surface of the operative zone of the element to be pressed between the laminating cylinders is very small, even if use is made of a relatively high uniform pressure, it is impossible to employ great power in order to obtain the required pressure.

According to the present invention it is possible to impart to the element any desired surface: glossy, mat, decorated or embossed, by interposing between the element and one or both of the laminating cylinders a metal sheet the surface of which that is intended to contact the element being provided with the desired characteristics. Alternatively, the metal sheet provided with the desired feature may be incorporated in the element. By this method, the panels are produced continuously, so that they can be made of any length and of a width corresponding to that of the laminating cylinders.

Specifically the present invention has for an object to provide a continuous method for producing a monolithic hollow unit from heat weldable resinous sheet material and which unit incorporates upper and lower panels or ribbons that are relatively stiff since they are formed from resin impregnated fibrous material such as wood or the like, and which unit further includes a plurality of strengthening ribs arranged in planes transverse to the planes containing the panels.

Still more specifically, the invention has for an object to provide a method of manufacturing hollow panels from heat weldable resinous sheet material comprising continuously moving at least two ribbons of said material in vertically spaced relationship through laminating cylinders, simultaneously inserting a plurality of spaced, longitudinal, vertically disposed ribs of the same material between the ribbons in the direction of their travel and simultaneously bonding the ribs to the ribbons by heat and pressure to form a monolithic hollow unit with spaced apart facings and strengthening ribs integrally united thereto.

The invention has for another object to provide apparatus for the continued production of the aforementioned monolithic hollow unit.

Figure 12:
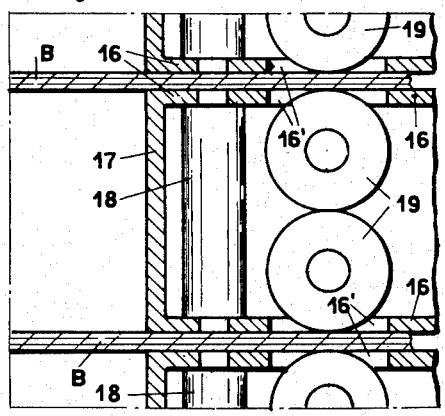
Figure 13:
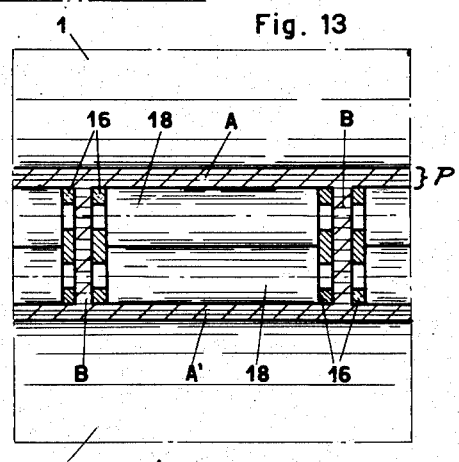
Figure 14:
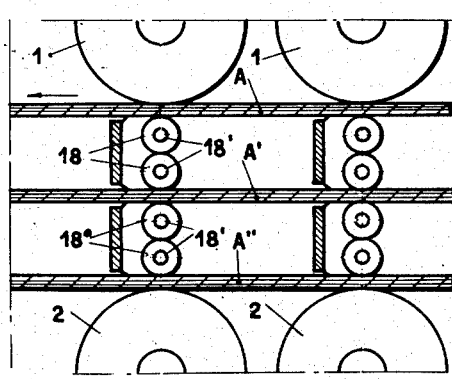
Figure 15:
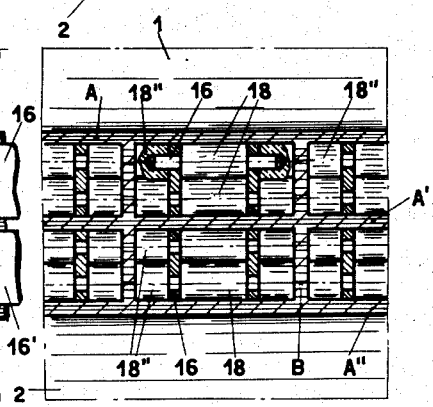
Figure 21:
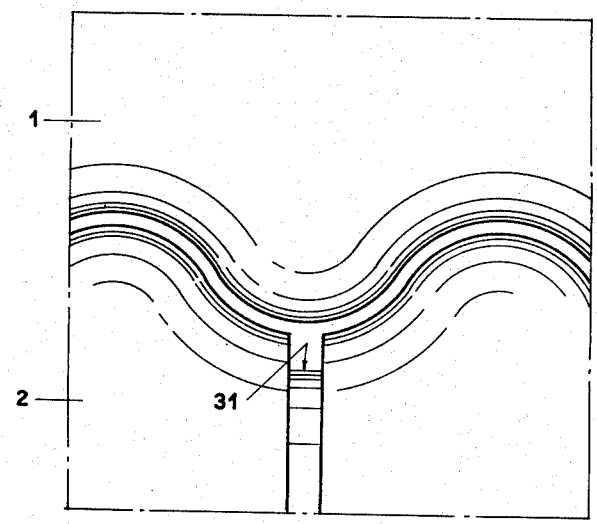
Figure 22:
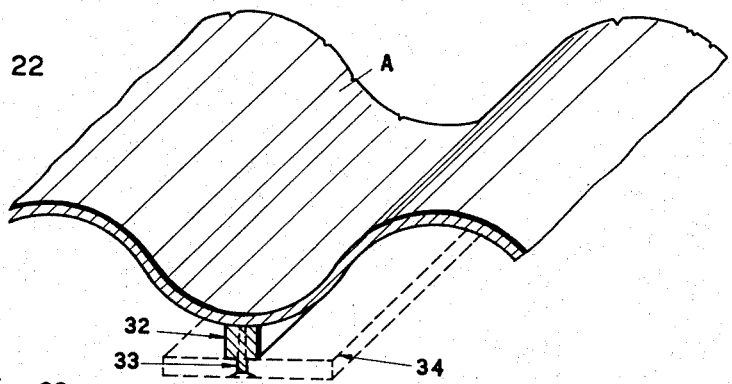
Figure 23:
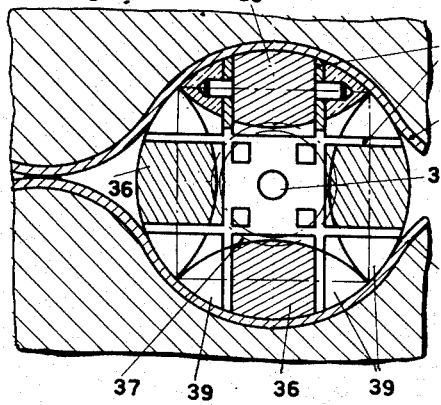
Figure 24:
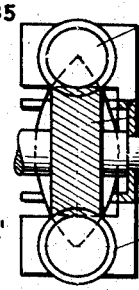
Figure 25:
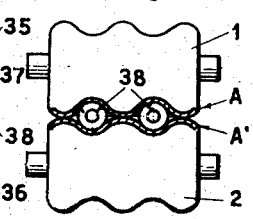

Further and more specific objects will be apparent from the following description taken in connection with the accompanying drawings, in which:

Figure 1 is a diagrammatic illustration of an embodiment of an apparatus for continuously producing flat panels or elements, Figure 2 is a diagrammatic illustration of a pair of the laminating cylinders utilized in carrying out the present invention, Figure 3 is a diagrammatic view illustrating the formation of a panel utilizing a pattern transfer sheet, Figures 4 and 5 respectively illustrate diagrammatically the method of producing curved panels, Figures 6, 6A and 6B respectively and diagrammatically illustrate the production of annular, framed or profiled elements, Figure 7 is a diagrammatic illustration of an apparatus utilized for producing an annular element wound upon one of the laminating cylinders, Figure 8 is a diagrammatic and longitudinal sectional view of apparatus utilized for making an undulated annular element, Figure 9 is a plan view of the arrangement shown in Figure 8, Figure 10 is a transverse sectional view taken along line 10—10 of Figure 8, Figure 11 is a fragmentary, diagrammatic longitudinal view partly in section and partly in elevation of an embodiment of the invention utilized for making the monolithic hollow unit, Figure 12 is a fragmentary view partly in horizontal cross-section and partly in elevation of the arrangement in Figure 11, Figure 13 is a fragmentary transverse view partly in section and partly in elevation of the arrangement in Figure 11, Figure 14 is a fragmentary longitudinal view partly in section and partly in elevation of an arrangement for constructing a modified form of monolithic hollow unit, Figure 15 is a transverse view partly in section and partly in elevation of the arrangement shown in Figure 14, Figure 16 is a fragmentary longitudinal view partly in section and partly in elevation of a modified form of the apparatus shown in Figure 11 and incorporating driven rollers for feeding the elements, Figure 17 is a transverse view partly in section and partly in elevation of some of the structure shown in Figure 16, Figure 18 is a fragmentary view partly in section and partly in elevation taken transversely of Figure 16 and illustrating two of the driven rollers, Figures 19 and 20 respectively diagrammatically illustrate a modified apparatus for forming undulated elements, Figure 21 is a fragmentary view illustrating laminating cylinders or rollers producing an undulating element having a stiffening rib, Figure 22 is a fragmentary perspective view of the element produced by the rollers shown in Figure 21, and Figures 23 to 25 diagrammatically illustrate apparatus for producing hollow double wall undulated elements with Figure 23 illustrating in fragmentary transverse cross-section the supporting or dragging mechanism embodied between the undulated element, Figure 24 illustrating partly in section and partly in elevation and at right angles to the arrangement of mechanism embodied in Figure 23, while Figure 25 illustrates a pair of calendering or laminating cylinders producing a hollow element of two undulated elements and diagrammatically illustrating the support means between the cavities in the elements.

In previous Italian Patents No. 326,372 of 1933 and No. 341,811 of 1936, in the same name as the present application, there is fully described and claimed the method of obtaining sheets by means of pressing into heated molds sheets or flat panels of dimensions corresponding to those of the molds, and of any desired material: fibrous or powdered wood, plywood, paper, card-board, fabrics, cellophane sheets, Plexiglas and the like, or a combination of these elements, either conglomerated with, impregnated with or unaccompanied by a binder of synthetic resin, or the material may or may not be intermingled with layers of synthetic resin, in fibrous sheets, even constituted and treated with a resin by the Dutch manufacturing process, or treated with a resin after molding. In the said patents there is also described the method of making panels decorated with drawings or designs, or engraved in relief or intaglio.

It is to be understood that everything which is described in the above-mentioned patents is used for the production of the panel or element according to the present invention, with the substantial difference that, according to the new process, the manufacture is carried out continuously by means of lamination to any required length, and a width equal to the width of the laminating cylinders, and that the panel or element may be made of any shape, for example, flat, undulating, convex or concave.

In its most simple digrammatic form, see Figures 1 and 2, the machine comprises at least one, but generally more, pairs of laminating or calendering cylinders 1, 2, driven in an opposite direction by means of a pair of gears shown diagrammatically at 1', 2' turning towards each other by any suitable means and the mutual distance between them can be controlled by adjusting means 3. The panel A to be produced which passes through every pair of cylinders is dragged and pressed by them in the tangential direction of the cylinders.

The panels between the succeeding pairs of the cylinders 1, 2 are preferably supported and if desired pressed by pairs of secondary rollers 4, 5.

The cylinders 1, 2 are heated in order to melt and subsequently bake the resin with which the panel A is impregnated, and the heating can be effected either by steam or electrically by means of an electric heater placed in the holes 6 provided at the periphery of each cylinder.

Moreover, since the panel A is made of a dielectric material it is possible to adopt the so-called radio or high frequency heating using a part of the panel as the dielectric of a condenser formed by the two armatures 7, see Figure 1, or by the cylinders being embodied in a circuit 8 wherein a high frequency oscillating current, about 10,000 kilocycles, is produced by means of a suitable electronic tube. By this arrangement the interior of the mass of the panel is heated. The radio frequency heating may be used in combination with or in substitution for the heating produced by the cylinders 1, 2.

According to the arrangement hereinbefore described the panel A passing at a convenient speed through the pairs of cylinders 1, 2 is heated first until the resin melts and then to the baking temperature of the resin and at the same time it is pressed to the required pressure, and it leaves the machine continuously and all formed.

Since the tangential zone between the cylinders 1, 2, where the pressure is effected, is a very small surface, it will be clear that even when using a high uniform pressure, it will suffice to use systems that are more simple in construction than the expensive hydraulic press hitherto used for pressing fibrous material into molds.

If it is desired to produce a particular finish on the surface of the panel or element, for instance, a bright finishing, it is necessary to interpose between the cylinders 1, 2 and the panel A to be produced, see Figure 3, a sheet 9 of a suitable material capable of withstanding the temperature and pressure which will be developed during the manufacture and the surface of which will come into contact with the panel to be produced thus imparting to the panel surface the required design or finishing: glossy, decorative, relief or the like.

Leaving the last pair of cylinders 1, 2, the sheets 9 are separated from the panel A. According to a modification one or both of the panels 9 is or are firmly incorporated in the panel A.

If the panel A, which leaves the last pair of cylinders 1, 2 while hot and flexible, is passed over a curved mold element 10 any desired bending may be imparted thereto.

The same result can be obtained by arranging the cylinders so that the planes containing the axes of several pairs of cylinders 1, 2 converge towards a point as shown in Figure 5.

The panel or element A may also take the shape of a circle as shown in Figure 6. In this case it is formed by bands provided with resin 11, 12 taken from storage rollers 11', 12', the thickness of the circle increasing gradually from the exterior or the interior. The circular panel A that is being formed passes in a continuous manner through the laminating cylinders 1, 2 being supported and guided by suitably disposed rollers 13. The panel may also be shaped in the form of a loom, frame or open profile, by using a rigid mould of the required shape, inserting it between the laminating cylinders by which it is conveyed and winding over it in one or more layers, one or more bands of the material treated with resin. The only limitation is that the radius of curvature at any point of the finished element is not to be less than the radius of curvature of the heated laminating cylinders.

This is shown by way of illustration in Figure 6a in which a rigid mould 40 is inserted between the cylinders 1 and 2 over which there is or are fed from storage rollers 11' one or more layers or one or more bands 11 treated with a resinous material. When the winding is completed and the pressing and baking effected, the whole is taken off the cylinders 1, 2, and mould 40 is removed and the element $A^x$ of the desired shape is thus obtained.

Figure 6b shows the production in a similar manner of an element $A^y$ obtained over an open mould 40'. By using the same procedure it is possible to obtain frames and bands of any desired shape and for any required purpose.

The laminated circular element A may also be produced by winding the band on one of the laminating cylinders, for instance, as shown in Figure 7. The laminating cylinder 1 on which the element A to be produced is wound and also the cylinder 2 may be undulated in the direction of the generatrix as is shown in Figures 8 and 9. The band 11 coming from the storage roller 11' is preferably undulated before reaching the tangential point over the cylinder 1. The undulation in advance may be effected by means of small wheels 14, 14' suitably arranged under and over the band 11 as shown in Figures 8 to 10; alternatively use may be made only of the upper small wheel 14, an undulated tile being used for the lower support of the band. The circular element thus formed may be used for roofing tiles, silos, tanks, wheel fellies and the like. If the circular elements are cut along one or more generatrices and placed while still hot and deformable over a support having any other curvature, they can be used for making furniture, in the building industry, as elements for roof coverings, more particularly if undulated, to replace tiles.

Hollow elements formed by two or more flat parallel walls A, A' may also be produced according to the invention by using a machine as shown in Figures 11 to 13. The machine includes the pairs of laminating cylinders 1, 2, which compress between them the panels A and A' held at a distance from one another by means of stiffening ribs B. In the longitudinal channels of the elements A and A' there are placed slidable distance boxes 17 and which boxes are preferably hinged together. Each box comprises a pair of superposed horizontal cylinders 18 in correspondence with every pair of laminating cylinders 1, 2, the said superposed horizontal cylinders being in engagement with each other and acting to support the pressure exerted from the exterior over the panels A, A' by the laminating cylinders 1, 2. Another pair of cylinders 19 with vertical axes also engaging with each other and visible through windows 16' abut against the stiffening ribs B and together with the cylinders 19 in the adjacent box keep the said ribs in position.

During the operation the laminating cylinders 1, 2, through the intermediary of the leading cylinders 18, press and heat the panels A, A', the whole being at the same time moved forward. The stiffening ribs B which are generally prepared separately and kept in place by the rollers 19 are welded to the side of the panels A, A'.

The modification shown in Figures 14 and 15 is used for the manufacture of panels A, A', A'' with distance stiffening ribs B. For every pair of laminating cylinders 1, 2, two superposed pairs of cylinders 18, 18° are used to support the pressure. Each of these cylinders consists of a central part with overhanging pivots 18' over which run the external parts 18''. Figures 16, 17 and 18 illustrate an arrangement in which the horizontal rollers 18 instead of being rotated by frictional engagement of the panels passing thereover are positively driven, thereby assisting in the forward feeding of the panels A, A'. The respective rollers 18 are provided with helicoidal driving surfaces meshing with one another. Each of these rollers is driven by a helicoidal wheel 20. The two helicoidal wheels 20 are disposed coaxial with each other to thereby impart rotation to each of the rollers 18 and the helicoidal wheels 20 which are connected for simultaneous rotation are driven by another helicoidal wheel 21 disposed between the wheels 20 and driven by a worm wheel 22 which is driven through gears 23 and 24 from a driving shaft 25 which also drives through gears 26 a countershaft 27. (See Figures 16 and 17.) The shafts 25 and 27 are provided with toothed rollers 25' and 27' which hold the stiffening ribs B in position and move them forward. The hollow elements thus obtained can be used for making furniture and in the building industry for walls, ceilings, floors, naval berths, and the like. The hollow cavities may be filled with insulating material or, if desired, wooden plugs may be inserted in the cavities so as to provide backings for receiving nails or screws in assembling the hollow elements together.

It is believed clear from the drawings and the aforegoing description, with particular reference to Figures 11 to 18, that this invention provides a continuous method for manufacturing hollow panels from heat weldable resinous sheet material and which method comprises the steps of continuously moving at least two ribbons of said material in vertically spaced relationship through laminating cylinders, simultaneously inserting a plurality of spaced longitudinally, vertically disposed ribs of the same material between the said ribbons in the direction of their travel and simultaneously bonding the ribs to the ribbons by heat and pressure so as to form a monolithic hollow unit with spaced strengthening ribs integrally united thereto.

The method utilizes sheet material that constitutes panels or ribbons that are relatively stiff since they are formed for resin impregnated fibrous materials, such as wood or the like.

Additionally, from a broad standpoint the method comprehends the production of hollow panels and simultaneous insertion of a heat and pressure resistant pattern transferring sheet between the outer surface of the ribbons and the adjacent cylinder surface so that when heat and pressure is applied to bond the ribs to the ribbons the pattern is simultaneously transferred to the ribbons. As previously indicated in the specification, the heat and pressure resistant pattern transferring sheet or sheets can either remain associated with the ribbons or be removed as indicated in Figure 3.

Furthermore, and as is clear from the drawings, regardless of whether the completed unit has merely upper and lower ribbons or panels A or A' as in Figures 11 to 13 or plural panels as in Figures 14 and 15, the apparatus includes at least one pair of laminating cylinders spaced vertically apart and mounted parallel to one another. These cylinders 1 and 2 constitute heat and pressure applying cylinders. Supported in the space between the cylinders are a plurality of box-like frames. These frames are arranged in series in spaced relation with respect to one another and with respect to the longitudinal axes of the cylinders and the said frames further have transverse dimensions substantially less than the longitudinal dimensions of the cylinders. Each of the frames as indicated in Figures 11 to 13 include parallel side walls 16 and upper and lower transverse webs 19', 19". A pair of abutting counter-pressure rolls 18 have pintles on the ends thereof journalled in the side walls 16. As is clear from Figure 11, the pair of rollers 18 contact one another and are disposed in the space between and respectively spaced from the laminating cylinders 1 and 2. These rollers 18 have their axes lying in a plane that passes through the axes of the cylinders. As is clear from Figure 12, the axes of all the counter-pressure rollers 18 in the series of frames 17 are in alignment. The vertical dimensions of the frame and the combined diameter of the counter-pressure rolls are such as to provide parallel spaces between the counter-pressure rolls and each cylinder of the pair of cylinders for the passage of the vertically spaced ribbons A and A' of the material. This space between each laminating cylinder and the adjacent counter-pressure roll of each pair of counter-pressure rolls is a broad transverse passage diagrammatically illustrated at P, Figure 13. The opposite side walls of the frame 17 have openings 16' therein. Guiding rolls 19 have their pintles rotatably journalled in the upper and lower transverse webs 19' and 19". The guiding rolls are mounted in pairs in each box-like frame 17 with their axes at right angles to the axes of the counter-pressure rolls 18. The periphery of the respective guiding rolls projects through the openings 16' in the opposite side wall 16 of the frame so that the guide rolls and adjacent frames are spaced from one another. The spacing between adjacent frames and thus between the facing surfaces of the guide rolls of adjacent frames permits the insertion and movement of the longitudinally extending, vertically disposed strengthening ribs B. As previously indicated, the cylinders 1 and 2 each have incorporated therewith heating means for applying heat to the cylinder so that the ribbons and the ribs are simultaneously bonded together in their passage through the apparatus to form the hollow monolithic element. The guide rolls 19 in one frame cooperating with the adjacent guide rolls 19 of the next adjacent frame. The space between adjacent frame 17 provides the narrow vertical passages or spaces for the reception of the ribs B.

As indicated in the modification disclosed in Figures 16 to 18, the apparatus includes means for positively driving the counter-pressure rolls and the guide rolls to insure the feeding of the ribbons and ribs in the formation of the hollow panel. The knurled driven rolls 25', 27' engaging the upper and lower surfaces of the strengthening ribs B'.

Figure 19 illustrates a modification consisting of a machine again embodying the cylinders 1 and 2, which, however, are provided with an undulated directrix. By means of that machine it is possible to produce a continuous undulating element in the transverse direction or an undulating ring wrapped over the cylinder 1 from a fibrous band 28 treated with resin and mounted on a supply roller 28'.

A few additional transverse rollers 29 in engagement with one another and supported by an oscillating arm 30 are used for the purpose of placing the material 28 inside the undulation of the cylinder 1 at the start.

Figure 20 diagrammatically illustrates another machine having calendering cylinders 1, 2 and also provided with an undulating directrix in which the crests and the cavities of the two cylinders are in phase or register with one another in the tangential zone. This arrangement permits the construction of hollow element constituted by a flat panel A disposed between the two undulating panels A° which are united to the panel A in the tangential zone of the cylinders.

Figure 21 illustrates a fragmentary view of a pair of calendering cylinders 1 and 2 with an undulating generatrix, one of which is provided with a groove 31. This pair of cylinders can be used to form an undulated element A, as seen in Figure 22, provided at one of its crests with a stiffening rib 22 which is inserted in the groove 31, and united to the element A during the pressing and baking operation. This element can be usefully employed for roof coverings because of the stiffening rib 32 which can be fixed by means of screws 33 to the frame 34 of the roof.

Figure 25 shows a pair of calendering cylinders 1, 2, with undulated generatrix, so placed that the crests in the cavities of the cylinders are in correspondence, thereby enabling a hollow element to be produced formed by the two undulated elements A, A' contacting with each other at their crests. For the purpose of pressing the walls of these elements in proper correspondence with one another a spherical support is provided for the purpose of supporting the pressure, the detail thereof being shown in Figures 23 and 24. The spherical support consists of a cross frame 35 between the arms of which there is rotatably mounted on pivots a barrel gear 36 with helicoidal teeth. The four gears 36 are rotated by means of a central gear 37 keyed to a driving shaft 38. Over the overhanging pivots of the gears are keyed ogives 39 which are joined to the two gears, the upper and lower gears 36, constituting the support of the elements A, A', facing each other with their cavities while the driven gears 36 constitute the dragging members of the assembly of the elements A, A' which are being treated by calendering and baking.

It is to be understood that the details for carrying the invention into effect may be modified without departing from its scope.

I claim:

1. A continuous method for manufacturing hollow panels from heat weldable resinous sheet material comprising the steps of continuously moving at least two ribbons of said material in vertically spaced relationship through laminating cylinders, simultaneously inserting a plurality of spaced, longitudinal, vertically disposed ribs of the same material between said ribbons in the direction of their travel and simultaneously bonding the ribs to the ribbons by heat and pressure to form a monolithic hollow unit of spaced apart facings and spaced strengthening ribs integrally united thereto.

2. A continuous method for manufacturing hollow panels from heat weldable resinous sheet material comprising the steps of continuously moving at least two ribbons of material through laminating cylinders, simultaneously inserting a plurality of longitudinal ribs of the material between said ribbons in the direction of their travel and a heat and pressure resistant pattern transferring sheet between the outer surface of the ribbon and the adjacent cylinder surface, simultaneously applying heat and pressure to bond the ribs to the ribbons to form a monolithic hollow structure and to simultaneously transfer the pattern to the ribbons.

3. A continuous method for manufacturing hollow panels as defined in and by claim 2, and removing the heat and pressure resistant pattern transferring sheet.

4. Apparatus for the continuous production of hollow panels from resin impregnated fibrous material including at least one pair of laminating cylinders spaced apart and parallel to one another, a plurality of box frames supported between the cylinders, said frames being arranged in series in spaced relation with respect to the longitudinal axes of the cylinders and said frames further having transverse dimensions substantially less than the longitudinal dimensions of the cylinders, each frame including parallel side walls and upper and lower transverse webs, a pair of counterpressure rolls journalled in the side walls of each frame, contacting one another and disposed in the space between and respectively spaced from the laminating cylinders, said rolls having their axes lying in a plane passing through the axes of the cylinders, the vertical dimensions of the frame and the combined diameters of the counterpressure rolls being such as to provide parallel spaces between the counterpressure rolls and each cylinder of the pair of cylinders for the passage of vertically spaced ribbons of said material, the opposite side walls of the frame having openings therein, guiding rolls rotatably supported in the upper and lower transverse webs of each frame with their axes at right angles to the axes of the counterpressure rolls and said guiding rolls having their peripheries projecting through the openings in the opposite side walls of the frame so that the guide rolls in adjacent frames are spaced from one another, the spacing between the adjacent frames and thus between adjacent guide rolls of respectively adjacent frames permitting insertion and movement of longitudinally extending vertically disposed strengthening ribs of said material, and heating means for applying heat to the cylinders so that the ribbons and ribs are simultaneously bonded together in passage through the apparatus.

5. An apparatus as defined in and by claim 4, including means for positively driving the counterpressure rolls and the guide rolls to insure the feeding of ribbons and ribs in the formation of a hollow panel.

6. In apparatus for continuously manufacturing hollow panels from heat and pressure bondable sheet material, the improvements comprising a pair of spaced laminating cylinders having parallel axes, a series of pairs of counterpressure rolls supported between the cylinders with their axes in alignment with one another, parallel to and co-planar with the axes of said cylinders, said pairs of rolls being respectively axially spaced from one another and cooperating with the laminating rollers to define broad transverse passages through which ribbons of said material can pass and narrow vertical passages between the pairs of counterpressure rolls through which longitudinal strengthening ribs can pass and pairs of guide rolls supported adjacent the counterpressure rolls with their axes perpendicular to the axes of the counterpressure rolls and with the pairs of guide rolls having their axes lying in the same plane and which plane is parallel to the plane containing the axes of the counterpressure rolls with the periphery of each of the guide rolls of each pair being spaced from the periphery of the adjacent guide roll of the next adjacent pair so as to guide the ribs in their passage.

GIUSEPPE STEFFENINO.

References Cited in the file of this patent

UNITED STATES PATENTS

| Number | Name | Date |
|---|---|---|
| 131,841 | Bibby | Oct. 1, 1872 |
| 969,555 | Neal | Sept. 6, 1910 |
| 1,483,452 | Keyes | Feb. 12, 1924 |
| 1,498,447 | Giard | June 17, 1924 |
| 1,852,451 | Everett | Apr. 5, 1932 |
| 1,873,279 | Brown | Aug. 23, 1932 |
| 2,038,510 | Goff | Apr. 21, 1936 |
| 2,324,068 | Crandell | July 13, 1943 |
| 2,352,900 | Kincaid | July 4, 1944 |
| 2,405,528 | Skolnik | Aug. 6, 1946 |
| 2,407,867 | Buchanan | Sept. 17, 1946 |
| 2,433,643 | Beach et al. | Dec. 30, 1947 |
| 2,434,466 | Marc | Jan. 13, 1948 |
| 2,445,290 | Gonda | July 13, 1948 |
| 2,459,295 | Skoog | Jan. 18, 1949 |
| 2,476,282 | Castellan | July 19, 1949 |
| 2,527,627 | Frankel et al. | Oct. 31, 1950 |
| 2,535,926 | Hunter et al. | Dec. 26, 1950 |